United States Patent
Benedict et al.

(10) Patent No.: US 7,017,405 B2
(45) Date of Patent: Mar. 28, 2006

(54) SYSTEM AND METHOD FOR POST-CURE APPLICATION OF ELECTRONICS TO A TIRE

(75) Inventors: Robert Leon Benedict, Tallmadge, OH (US); Peter Ross Shepler, Stow, OH (US); Stephen Frederick Roth, Port Clinton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 126 days.

(21) Appl. No.: 10/744,253

(22) Filed: Dec. 22, 2003

(65) Prior Publication Data

US 2005/0132787 A1 Jun. 23, 2005

(51) Int. Cl.
*B60C 23/02* (2006.01)

(52) U.S. Cl. .................................... 73/146.5
(58) Field of Classification Search ............... 73/146, 73/146.4, 146.5
See application file for complete search history.

(56) References Cited

U.S. PATENT DOCUMENTS

| | | | | |
|---|---|---|---|---|
| 6,388,567 | B1 * | 5/2002 | Bohm et al. | 340/442 |
| 6,518,933 | B1 * | 2/2003 | Pecora et al. | 343/793 |
| 6,899,153 | B1 * | 5/2005 | Pollack et al. | 152/152.1 |
| 2004/0021558 | A1 * | 2/2004 | Kelly et al. | 340/442 |
| 2005/0088361 | A1 * | 4/2005 | Kelly et al. | 343/873 |

* cited by examiner

*Primary Examiner*—Max Noori
(74) *Attorney, Agent, or Firm*—Richard B. O'Planick

(57) ABSTRACT

A system and method for post-cure application of electronics to a tire includes: a first stage assembly in which an ends of an annular antenna wire are positioned within conductive grommets in a base member; a second stage in which a plug is affixed to the base member to hold the antenna ends in place during shaping and curing of the antenna wire into a tire; and a third stage in which the plug is replaced by a tag carrier, the carrier including means for establishing and maintaining electrical contact between the antenna ends and the tag.

12 Claims, 3 Drawing Sheets

SYSTEM AND METHOD FOR POST-CURE APPLICATION OF ELECTRONICS TO A TIRE

FIELD OF THE INVENTION

The subject invention relates generally to systems and methods for applying electronics to a tire for the purpose of monitoring tire condition parameters and, more specifically, to a system and method for electrically connecting such electronics to a tire-mounted antenna so as to facilitate communication between the electronics and a remote reader/transmitter by means of the antenna.

BACKGROUND OF THE INVENTION

It is common to employ annular apparatus, including an antenna, for electronically transmitting tire or wheel identification or other data at radio frequency. The apparatus includes a radio-frequency tag, or transponder, comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

The annular antenna is tire-mounted and transmits, at radio frequencies, data from the transponder to a reader mounted on the wheel assembly. The antenna and transponder may be incorporated into a tire during "pre-cure" manufacture of the tire. The integrity of the connection between the tire and antenna is greatly enhanced by a pre-cure assembly procedure. In practice, however, it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. An annular antenna and the electronic tag associated therewith built into the tire in a pre-cure process, therefore, must endure significant strain that can result in component failure. The electronic tag and the connection between the tag and the antenna, in particular, is vulnerable to damage from the forces imposed from pre-cure assembly to tire.

To avoid damaging the electronic tag or the connection between the tag and the annular antenna during the curing procedure, an alternative known approach is to assemble the tag and antenna into a separate annular apparatus for post-cure attachment to the tire. The annular apparatus may be attached to the tire after the tire is cured by adhesive or other known techniques. While such an approach avoids damaging the tag electronics during tire manufacture, adhesive attachment of the antenna and tag to a tire in a post-cure procedure has certain drawbacks. First, the procedure adds labor, and hence cost, to the manufacturing process. Secondly, the security of the attachment between the annular apparatus and the tire is dependent upon the efficacy of the adhesive system employed. Development of a suitable adhesive that is inexpensive, convenient to use, and durable enough to function throughout the life cycle of a tire has proven problematic.

Accordingly, there remains a need for a system and method of applying tag electronics to a tire that is convenient, cost effective, and reliable. Such a procedure should further ensure the functional safety of the electronics and result in a positive electrical connection between the antenna and tag electronics. Finally, such a procedure ideally would incorporate the advantages, but avoid the shortcomings, of both the pre-cure and post-cure assembly alternatives discussed above.

SUMMARY OF THE INVENTION

A method for post-cure application of electronics to a tire is disclosed that achieves the objectives of positively securing an antenna apparatus to a tire while protecting the electronics from the damaging forces attendant tire manufacture. The method comprises the steps: forming an antenna wire into a predetermined shape having first and second free ends; interposing a base plate between the free antenna ends, the base member having conductive regions surrounding grommet openings; positioning the free antenna ends into electrical contact with respective base plate conductive portions; affixing a removable plug to the base member to hold the antenna free ends in contact with the base member conductive portions; curing the antenna wire into a tire during a tire manufacturing procedure; removing the plug from the base member in a post-cure operation; affixing a tag carrier to the base member; and establishing electrical contact between the tag carrier and the antenna free ends. Pursuant to one aspect of the invention, the method may include the step of forming the antenna wire into an annular configuration. Pursuant to another aspect, the method may comprise the steps of extending the antenna ends through respective conductive grommets in the base plate, affixing the removable plug to the base plate by means of inserting plug prongs into the base member grommets, and maintaining the antenna ends in place by means of the plug prongs.

A further aspect of the invention provides that the removable plug and tag carrier interchangeably mate to the base plate. The plug member is incorporated within the antenna assembly during its attachment to a tire during tire manufacture. Thereafter, the plug member is conveniently replaced in a post-cure operation by the tag carrier. The tag carrier electronics are thereby protected from damage during tire manufacture. The tag carrier and plug member are inexpensive to manufacture, readily incorporated into the antenna assembly, and conveniently interchangeable.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 8:
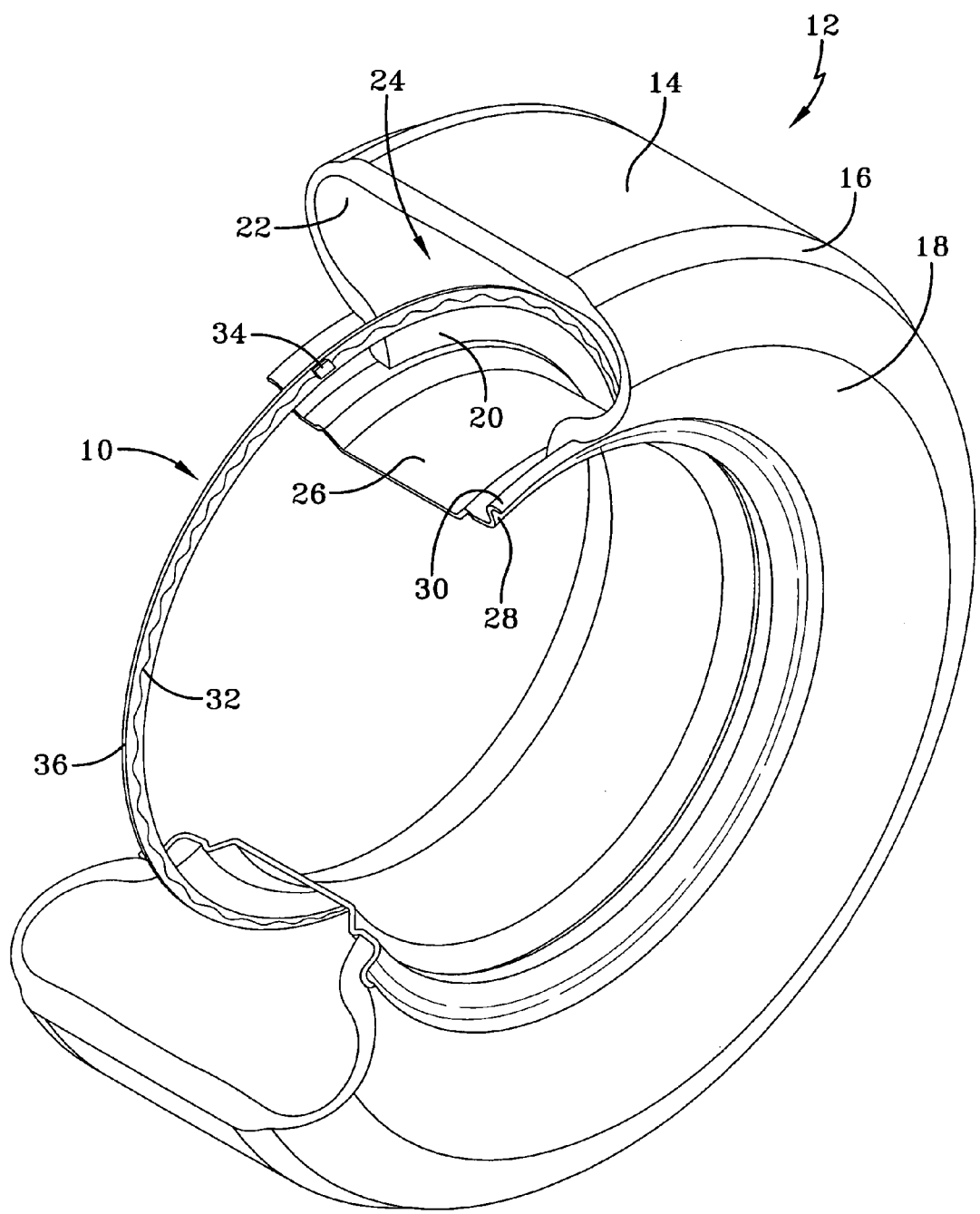
FIG. 8 is a perspective view shown partially in section for illustration of a tire having the annular antenna assembly affixed thereto.

Referring initially to FIG. 8, a preferred embodiment 10 of the subject invention is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange 28 and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 32 provides flexibility and minimizes the risk of breakage during manufacture and use of the tire.

Figure 1:
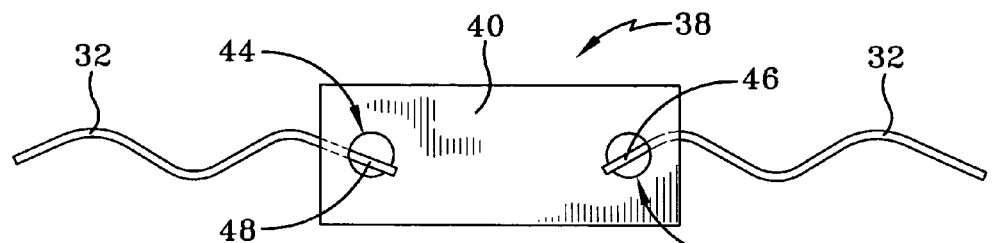
FIG. 1 is a top plan view of the base plate with antenna ends in contact therewith.

With continued reference to FIG. 1, a tag carrier 34 of the general type described above is provided and may include means for sensing tire parameters such as pressure and temperature. Included as part of the apparatus 10 is a carrier strip of material 36 formed into the annular configuration shown. Carrier strip 36 is formed of electrically insulating, preferably semi-rigid elastomeric material common to industry such as rubber or plastic. The strip 36 is formed to substantially encapsulate the antenna wire(s) 32 and at least a portion of the tag carrier 34. In the post manufacturing state shown in FIG. 1, therefore, the apparatus 10 comprises antenna 32, tag carrier 34, and carrier strip 36, in a unitary, generally circular, assembly. The diameter of the apparatus assembly 10 is a function of the size of the tire 12. The preferred location of the antenna assembly 10 on the tire is on the tire just above the rim flange 30. Such a location minimizes stress forces on the assembly from operation of the tire and minimizes interference to RF communication between the tag and an external reader (not shown) that might otherwise be caused by the metal rim. Other mounting locations of the antenna assembly 10 on the tire, however, may be employed if desired for specific tire applications.

From FIG. 8, it will be apparent that an optimal manner for attaching annular assembly 10 to a tire is during the tire manufacturing process. In curing the tire, the assembly 10 will adhere directly to the liner 22 and a reliable mechanical connection results. However, for the reasons previously discussed, the tire manufacturing operation can impart significant stress to the tag 70, and/or its leads 72, 74, resulting in a failure of the electronics. The subject invention avoids the possibility of such a failure by replacing the tag 70 with a temporary assembly during the manufacturing process.

Referring to FIG. 1, the invention utilizes a base plate 38 having a main body 40 of generally rectangular configuration formed of electrically conductive material such as copper or steel. The base plate body 40 includes a pair of spaced apart circular grommets 42, 44 extending therethrough. The plate 38 is disposed between free ends 46, 48 of the antenna wire 32 in a first stage of the assembly process. Free antenna ends 46, 48 are routed from an underside of the plate 38 up and through respective grommets 42, 44 as shown. The grommets 42, 44 conduct electrical signals between the antenna and a tag electronics package by means of antenna ends 46, 48.

Figure 2:
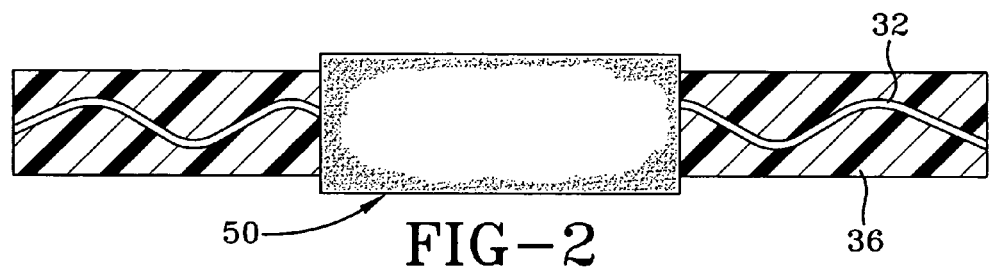
FIG. 2 is a top plan view of the plug member and antenna assembly prior to attachment to a tire.
Figure 3:
FIG. 3 is a side elevational view of the plug member.
Figure 4:
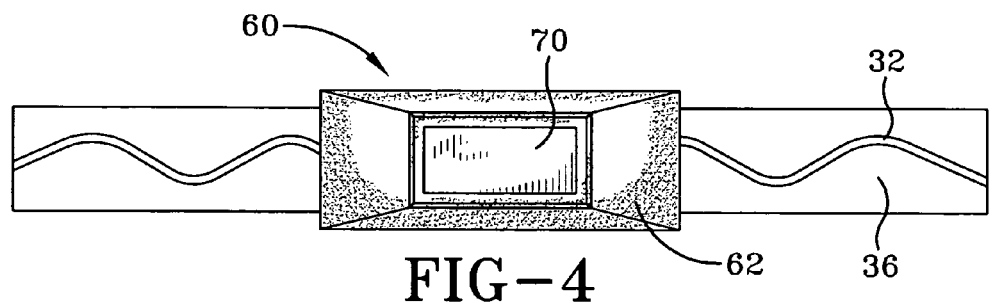
FIG. 4 is a top plan view of the tag carrier and antenna assembly.

With regard to FIGS. 1, 2 and 3, in a second stage of the assembly process, the antenna ends 46, 48, are held in place by means of a plug member 50 coupled to the base plate 38. The plug member 50 includes a rectangular body 52 dimensioned to substantially cover base plate 38. Protruding from the body 52 are spaced apart prongs or protrusions 54, 56, each prong having an enlarged diametric dimension at the equator 58. Prongs 54, 56 are dimensioned and spaced for press insertion into apertures 42, 44 of base plate 38, whereby the plug member 50 may be detachably coupled to the base plate 38. Frictional retention force between prongs 54, 56 and apertures 42, 44 may be varied and adjusted by adjusting the diametric dimension and configuration of prongs 54, 56 as will be understood by those in the art. Plug member 50 may be detached from the base plate 38 by pulling the prongs 54, 56 out of respective apertures 42, 44. Press insertion of prongs 54, 56 into apertures 42, 44 pinches the antenna ends 46, 48 against sides of the apertures 42, 44 and prevents withdrawal of the wires during the shaping and curing process.

The annular assembly, with plug member 50, shown in FIG. 2 is thereafter shaped to conform to a tire and positioned against the tire liner as explained above and illustrated in FIG. 8. The tire is cured and the annular antenna assembly is thereby cured into the tire. The plug member 50 throughout the procedure maintains the fixed relationship between the antenna wire ends 42, 44 and the base plate 38.

Figure 5:
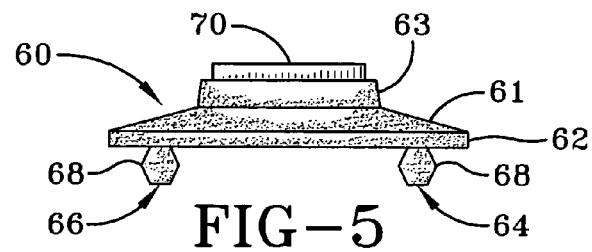
FIG. 5 is a side elevational view of the tag carrier.
Figure 6:
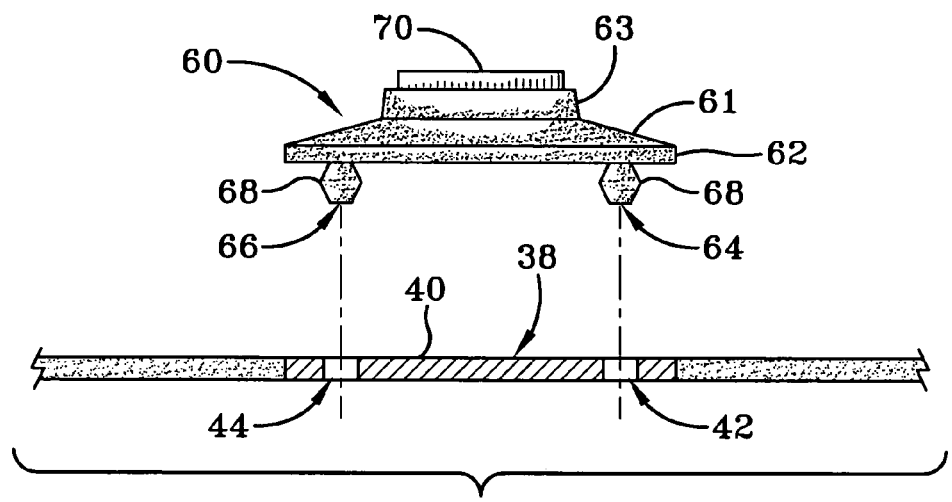
FIG. 6 is an exploded side elevational view of the tag carrier and antenna assembly.
Figure 7:
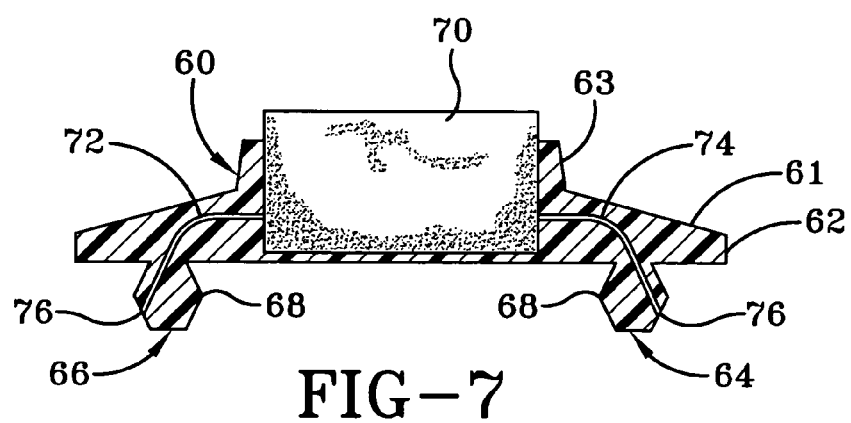
FIG. 7 is a longitudinal section view through the tag carrier of FIG. 5, taken along the line 5—5.

The tag carrier is illustrated in detail by FIGS. 5, 6, and 7. As shown, carrier 60 comprises a carrier body 62 formed of any suitable material such as plastic. The body 62 has inwardly and upwardly tapering sides 61 that lead to an upper cylindrical socket 63. Depending from the body 62 are spaced apart prongs or protrusions 64, 66. Prongs 64, 66 are formed to have an enlarged equatorial diameter 68. Seated and secured within the socket 63 is an electronic tag 70. The invention is not intended to be tag specific and any suitable electronic tag available in the industry may be employed. Typical tag packages have sensor means for measuring the temperature and pressure within a tire cavity. Such tags may further have stored therein an identification code for identifying the tire associated therewith. Tags of the subject general type may be powered by a local source such as a battery. More useful, however, are tags that are powered by an external RF energy source transmitted to the tag by means of an antenna. Such configurations do not require battery replacement and are therefore considered preferable. Typically, tags communicate by RF signal through an antenna to an external reader on a vehicle. Connection between the tag and the antenna is by means of conductor leads 72, 74. As best seen from FIG. 7, the leads 72, 74 are extended through the carrier body 62 to terminal ends 76 located at an outside surface of each carrier prong 64, 66, proximate to the equatorial plane 68. The leads 72, 74 are stabilized by the carrier body 62 so that the terminal ends 76 are fixed in their intended orientation outboard of prongs 64, 66 substantially at the equatorial plane 68.

In a post-cure operation, the plug member 50 is removed from attachment with the base plate 38 by extraction of prongs 54, 58 from apertures 42, 44. The antenna ends 46, 48 will remain within grommets 42, 44. In a next step, the tag carrier of FIG. 5 is inserted into mating engagement with the base plate 38 by the press insertion of carrier prongs 64, 66 into the grommet apertures 42, 44. The prongs 64, 66 replace the prongs 54, 56 of the plug member 50 and are of like configuration, having an enlarged equatorial diameter 68. The prongs 64, 66 pressure the antenna leads 42, 44 against sides of apertures 42, 44 and ensure that positive electrical contact is established and maintained between the antenna ends 42, 44 and the base plate 38. See FIG. 6.

With reference to FIGS. 6 and 7, it will further be noted that insertion of prongs 64, 66 into grommet apertures 42,44 also establishes and maintains electrical contact between the terminal ends 76 of tag leads 72, 74 and the base plate 38. Preferably prongs 64, 66 and 54, 58 are formed of resilient plastics material. As they are press inserted into the base plate grommets, the prongs will be compressed and exert radially directed outward force against the ends of the antenna. The terminal ends 76 of the tag 70 are disposed at the oversized equatorial plane of each prong such that when the prongs 64, 66 are fully inserted into their respective grommet, the ends 76 of each lead will be pressured against sidewalls defining each grommet. Positive electrical continuity is thereby established between the tag 70 and the base plate 38 through leads 72, 74. The antenna is likewise electrically in contact with the base plate 38 as the same carrier prongs 64, 66 serve to pressure antenna ends 46, 48 against the grommet sidewalls. Resultantly, there is established and maintained an electrical continuity between tag 70 and the antenna 32.

From the foregoing, it will be appreciated that the subject invention accomplishes the needs outlined above. First, the subject method allows the annular antenna and carrier strip to be incorporated within the tire during the tire building operation, resulting in a mechanical connection of high integrity. The tag 70, however, is spared from exposure to stresses associated with the tire building operation by the substitution of plug member 60. The plug member 60 is conveniently inserted into the annular antenna apparatus and serves to maintain the antenna ends at their designated locations within base plate grommets. In a post-cure operation, the plug member may be conveniently removed and replaced with the tag carrier. Replacement effectively establishes electrical continuity between the tag electronics and the annular antenna wire without the need for extensive labor or parts. The tag electronics are thereby incorporated into the annular antenna assembly at a final stage.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An antenna assembly for application to a tire, the assembly comprising:
   a shaped antenna wire having first and second ends;
   a base member having at least first and second apertures and conductive portions, each aperture receiving a respective one of the antenna wire ends therein; and
   a removable plug member attached to the base member and having at least first and second plug member protrusions press inserting into a respective base member aperture, each protrusion engaging and securing a respective antenna end between the protrusion and a base member conductive portion.

2. An antenna assembly according to claim 1 wherein the base member conductive portions comprise conductive grommets extending through the base member and respectively receiving and contacting the antenna wire ends.

3. An antenna assembly according to claim 2 wherein the plug member first and second protrusions are receivable by press insertion into a respective base member conductive grommet, to retain a respective wire end within the conductive grommet.

4. An antenna assembly according to claim 3 wherein the plug member comprises a temporary plug insert configured for engagement with the base member during manufacture of the tire and configured for removal from the base member in a post-cure operation.

5. An antenna assembly according to claim 3 wherein the plug member comprises a tag carrier configured for engagement with the base member in a post-cure operation.

6. An antenna assembly according to claim 5, wherein the tag carrier comprises:
   a carrier body having a tag supporting surface;
   at least one conductor extending from the tag to an outer surface of each said protrusion, the conductor positioned to contact the conductive grommet upon insertion of the protrusion into the grommet.

7. A tag carrier for insertion into an antenna apparatus of the type comprising a shaped antenna wire having first and second opposite ends and a base member having conductive portions for respectively receiving and electrically contacting the antenna wire ends, the tag carrier comprising:
   a carrier body having a tag supporting surface and at least one protrusion depending from the body for engagement with the conductive portion of the base member;
   a conductor extending from the tag to an outer surface of the one protrusion, the conductor being positioned to establish electrical contact with the conductive base member portion upon establishment of engagement between the carrier body and the base member.

8. A tag carrier according to claim 7, wherein the carrier body protrusion is receivable within a conductive grommet within the base member.

9. An antenna assembly for application to a tire in pre-cure and post-cure stages, the assembly comprising:
   a shaped antenna wire having first and second ends:
   a base member having conductive portions;
   a removable plug member configured for pre-cure attachment to the base member, the plug member having at least one coupling protrusion configured to extend into the base member to engage at least the first antenna end and maintain the first antenna end against a conductive portion of the base member;
   a carrier body configured to replace the plug member in a post-cure attachment to the base member, the carrier body having a tag supporting surface and at least one coupling protrusion configured to extend into the base member to engage the first antenna end and maintain the first antenna end against the conductive portion of the base member.

10. An antenna assembly according to claim 9, wherein at least one conductor extends from the tag to an outer surface of the carrier body coupling protrusion positioned to contact the conductive portion of the base member upon extension of the carrier body protrusion into the base member.

11. An antenna assembly according to claim 9, wherein the protrusion of the plug member and the protrusion of the carrier body are of a substantially like configuration.

12. An antenna assembly according to claim 9, wherein the protrusion of the plug member and the protrusion of the carrier body alternatively press insert into a conductive grommet within the base member.

* * * * *